Feb. 7, 1939.  B. C. BAADE  2,146,668
RETRACTABLE CAR STEP
Filed July 11, 1936  2 Sheets-Sheet 1

Inventor
BRUNOLF C. BAADE

By

Attorney

Feb. 7, 1939.   B. C. BAADE   2,146,668
RETRACTABLE CAR STEP
Filed July 11, 1936   2 Sheets-Sheet 2

Inventor
BRUNOLF C. BAADE

Patented Feb. 7, 1939

2,146,668

UNITED STATES PATENT OFFICE 2,146,668

RETRACTABLE CAR STEP

Brunolf C. Baade, Akron, Ohio, assignor to Goodyear-Zeppelin Corporation, Akron, Ohio, a corporation of Delaware Application July 11, 1936, Serial No. 90,167

8 Claims. (Cl. 105—450)

This invention relates to an entrance step for cars in general, and more particularly for highspeed rail cars.

For high-speed cars it is very important to avoid all unnecessary projections and interruptions of a continuous smooth outer surface which have the tendency of creating air resistance. The entrance step is one of those projections, which are to be eliminated according to this invention by making it retractable. Retractable steps on railroad cars have been in use before, however, without having the advantages incorporated in this invention.

The main object of this invention is to provide in the outer wall of a car an entrance step which is to serve two purposes. In the first place, when in open position, as a step, and second, when moved to retracted position as a portion of the car floor and of the outer wall of the car body.

Another object of this invention is the provision of a shear connection on the step to guard the car structure against damage in the event the open step should strike an object while the car is in motion.

Another object of this invention is to provide a simple, efficient retractable step which serves as a step and also as part of the inner platform as well as part of the car body when in retracted position.

Other objects of this invention will appear hereinafter as the description thereof proceeds, the novel features, arrangements and combinations being clearly set forth in the specification and the claims thereunto appended.

For a better understanding of this invention reference may now be had to the accompanying drawings of which:

Figure 1:
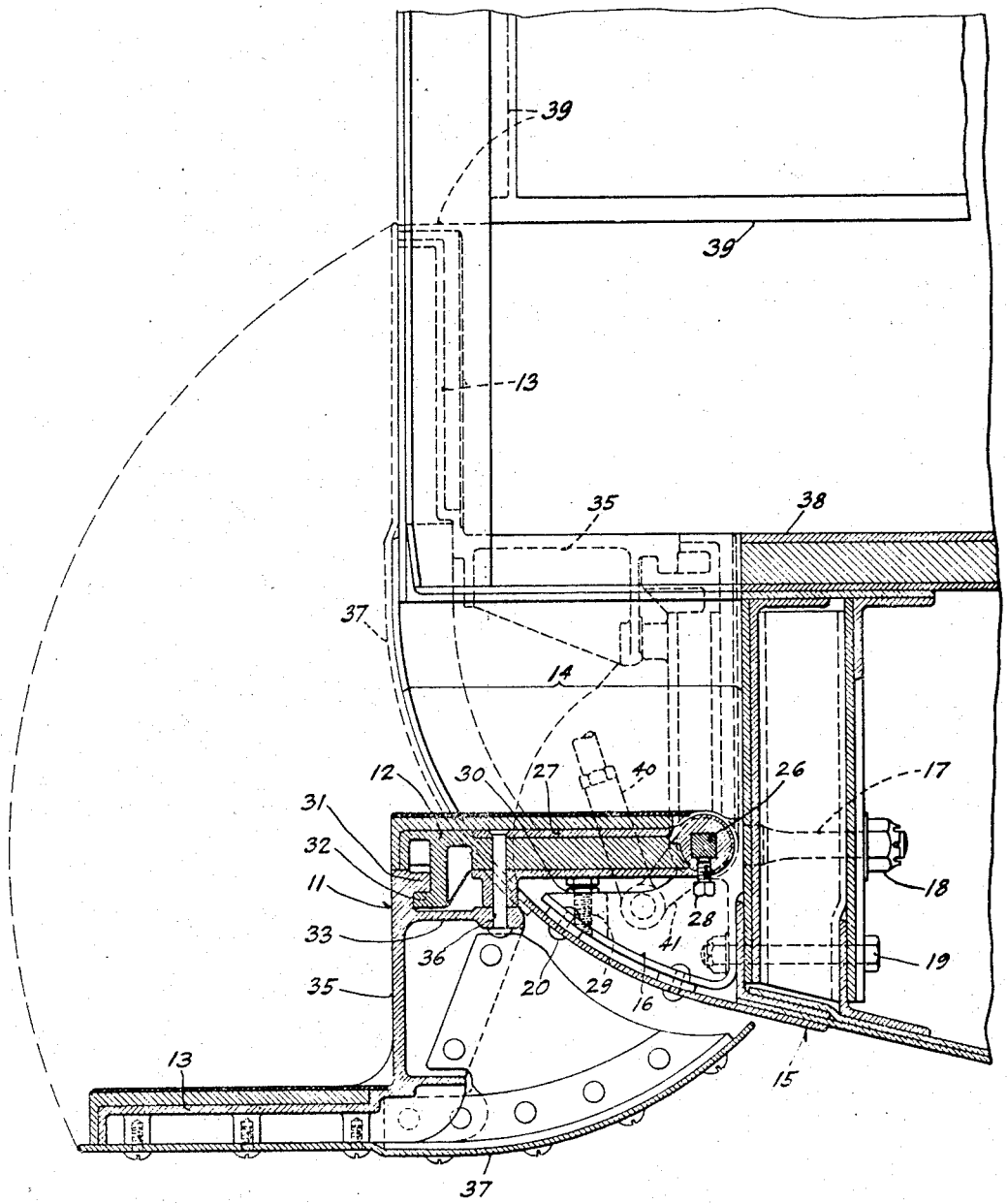
Fig. 1 is a cross-sectional view of a car having a step arranged in open position, the section being taken along the line 1—1 of Fig. 2.
Figure 2:
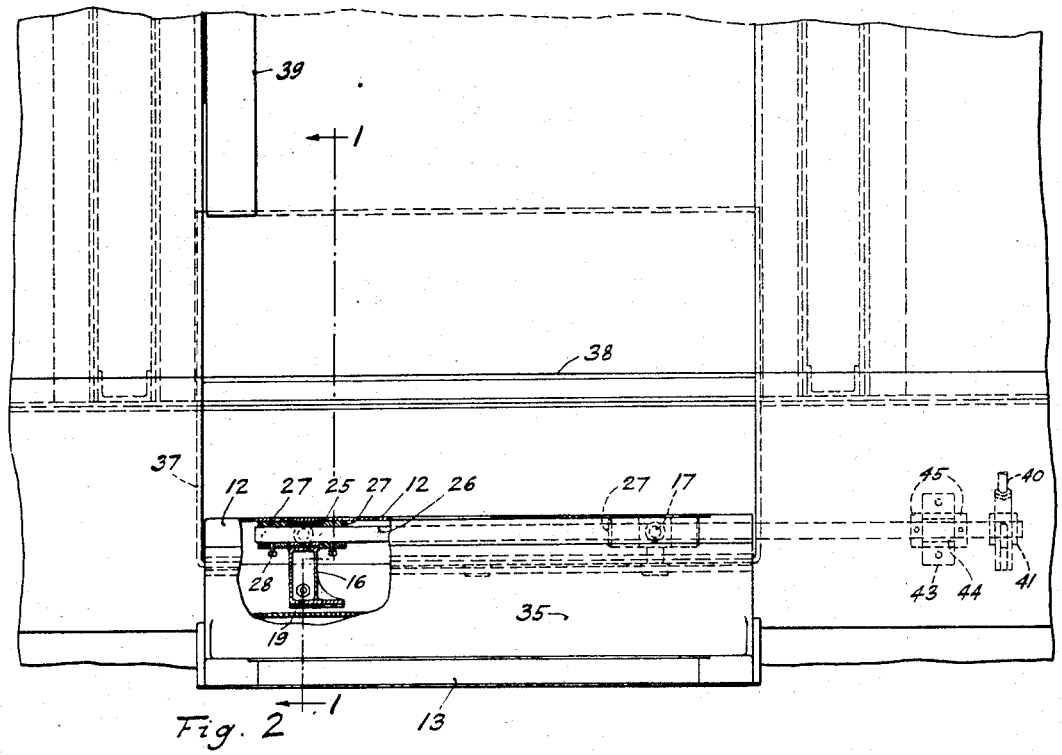
Fig. 2 is a longitudinal side view of the step in smaller scale, with a portion broken out to show the hinge in section.
Figure 3:
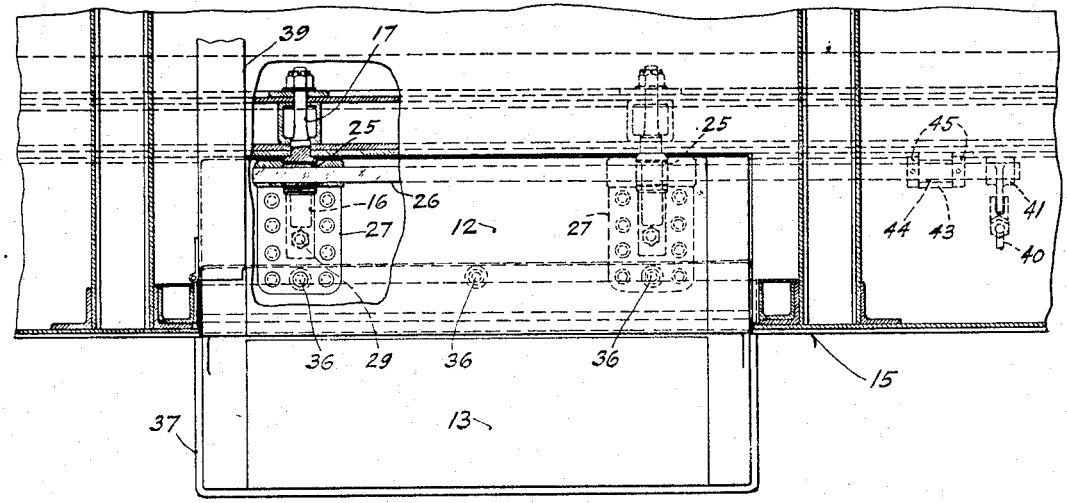
Fig. 3 is a top view of Fig. 2, with a portion broken out to show the hinge partly in section.

In Fig. 1 the retractable step 11, shown in lowered position, consists of two treads 12 and 13 which fit into the aperture 14 of the car body structure 15, to which brackets 16 are attached by means of shanks 17 which are integral parts of the brackets, and nuts 18, as well as by bolts 19 and rivets 20. Into the brackets 16 are inserted round sleeves 25 (Figs. 2 and 3) turnable in the brackets and provided with a square hole into which fits the square shaft 26, to which the step is secured. The upper tread 12 is provided with hinge butts 27 carried by the square shaft 26 and between which butts fit the brackets 16. The hinges are secured against longitudinal movement on the shaft by set screws 28. Adjusting screws 29 in the brackets 16 and a fixing nut 30 arrest the treads in the proper downward position. The lower tread 13, together with its riser 35, is supported by a transverse L-shaped projection 31 extending longitudinally and resting on a corresponding L-shaped projection 32 of the tread 12. A flange 33 extending along the riser 35 secures the lower tread to the upper tread by three rivets 36, giving a certain shearing strength to hold the treads together. The riser abuts at its upper longitudinal edge with the outer lower edge of the upper tread, thus making a stiff connection between upper and lower tread.

In case the step is in its lower position and the car should move, an obstruction hitting the lower tread will simply shear off the rivets 36 and slide off from the upper tread without doing damage to the upper tread or to the car structure. To cover the aperture 14 of the outer cover of the car body when the step is in its inoperative or closed position, the lower tread 13 is provided on its lower side with a cover plate 37 which extends into the curved portion of the car body and fully covers the opening when the step is in raised position. In raised position the riser 35 is flush with the top of the car vestibule floor 38 and fills in the missing portion of the car floor, whereas the lower tread 13 replaces a portion of the entrance door 39 which is shown in full lines in open position and in dash lines in closed position.

The step is operated by an electro-pneumatic device available on the market (not shown), which connects by a rod 40 to a lever 41 secured at one end of the square shaft 26, outside of the bearing 43, which is provided with a round bushing 44 held in place by collars 45. The door 39 also may be connected to the electro-pneumatic controlling device and closed thereby together with the raising of the step which only turns through an angle of 90 degrees from the raised to the lowered position.

It is to be understood that this invention is not limited to the specific construction shown in the drawings, and may be changed according to requirements within its spirit and within the scope of the appended claims.

I claim:

1. In combination, a vehicle body having an aperture in the outer surface thereof, a retractable entrance step, comprising two treads and a riser connecting said treads, fitting and being secured by a hinge within said aperture to the vehicle body, an outer covering and an extension on the lower tread, the step in raised condition forming by means of its lower tread covering and extension a portion of the outer surface of said body and by means of the riser connecting said treads, a portion of the floor of the vehicle body.

2. In a vehicle, the combination with a vehicle body of a step having a supporting portion and a tread portion, the latter extending beyond the outer contour of said body, a connection between said step and body including interlocking members capable of sustaining normal vertical loads placed on said step, and a plurality of rivets of low shear strength holding said interlocking connections in operative relation, the interlocking relations being such as to permit detachment of the step from the body in at least one horizontal direction if and when a force is exerted in that direction sufficient to destroy the rivet connection.

3. A car construction comprising a car having a floor recessed adjacent the outer surface of the body of the car, a step pivoted in said recess having a riser and a tread portion, the pivot for said step being at the inner edge of said tread portion at a distance below said floor substantially equal to the width of the tread portion of said step and directly beneath the inner portion of said recess, whereby when said step is moved through substantially 90° upwardly the riser moves into substantial alignment with the floor and forms a continuation thereof, said riser being provided with another tread at the lower edge thereof, which tread extends vertically from said riser when said treads are moved to inoperative position, the under surface of said second-mentioned tread forming a portion of the outer surface of said body.

4. In a vehicle, the combination with a body having an inner platform therein and a recess adjacent thereto to receive a movable car step, a car step having a tread portion and a depending riser mounted within said recess for angular movement substantially about the inner edge of said tread portion from a position where said tread portion is substantially horizontal to a position wherein said tread portion is substantially vertical and the riser is in a position to form an extension of said platform and to substantially fill the recess therein, said riser carrying an additional tread portion at the lower edge thereof, which portion forms a portion of the outer surface of said vehicle body when said riser is in position to form a continuation of said platform.

5. In a vehicle, the combination with a body of a step having a tread portion, a support on said body for said step, the tread portion extending beyond the outer contour of the body, sufficiently strong means interconnecting said step and support to sustain vertical loads on said tread portion, and means relatively weak in horizontal shear for resisting separation of said step and support horizontally, whereby to permit the step to be readily separated from said support when struck by means having a substantial horizontal force component.

6. In a vehicle, the combination with a body of a step having a tread portion, a support on said body for said step, the tread portion extending beyond the outer contour of the body, sufficiently strong means interconnecting said step and support to sustain vertical loads on said tread portion, and means relatively weak in horizontal shear for resisting separation of said step and support horizontally, whereby to permit the step to be readily separated from said support when struck by means having a substantial horizontal force component, said interconnecting means comprising interlocking horizontally arranged flanges on said step and support.

7. In a vehicle, the combination with a body of a step having a tread portion, a support on said body for said step, the tread portion extending beyond the outer contour of the body, sufficiently strong means interconnecting said step and support to sustain vertical loads on said tread portion, and means relatively weak in horizontal shear for resisting separation of said step and support horizontally, whereby to permit the step to be readily separated from said support when struck by means having a substantial horizontal force component, said interconnecting means being constructed to sustain vertical loads independently of said relatively weak means.

8. The combination with a vehicle body of a step having a tread portion and a supporting portion, said supporting portion extending substantially vertically and having an inwardly turned flange at its upper edge, a substantially horizontal outwardly extending flange carried by said car body and on which said first-mentioned flange rests, means for bracing said supporting portion against rotative movement when a vertical load is applied to said tread portion, and a shear connection for holding the aforesaid flanges in supporting relation with each other, comprising means which is relatively weak in horizontal shear for resisting horizontal shifting of said flanges whereby horizontal forces of sufficient magnitude may shear the said connection and permit separation of said flanges horizontally, the said flanges being so constructed and arranged as to permit separation thereof when said shear connection is destroyed.

BRUNOLF C. BAADE.